Patented July 11, 1944

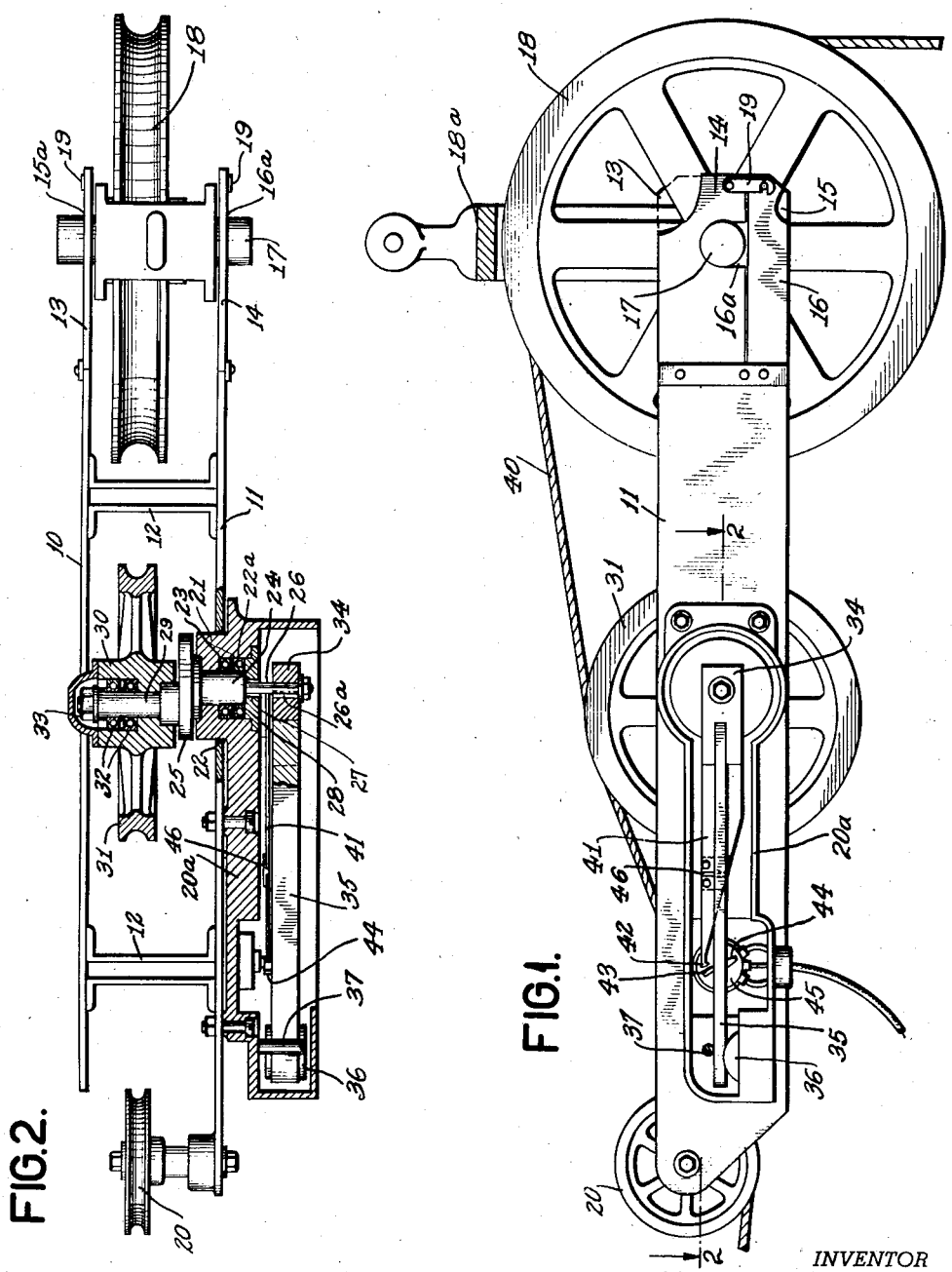

2,353,249

UNITED STATES PATENT OFFICE 2,353,249

TENSION MEASURING DEVICE

Maurice P. Lebourg, Houston, Tex., assignor to Schlumberger Well Surveying Corporation, Houston, Tex., a corporation of Delaware Application May 19, 1942, Serial No. 443,579

5 Claims. (Cl. 265—1.6)

The present invention relates to force measuring devices, and more specifically to new and improved apparatus for accurately measuring the tension in a cable of the type used in raising and lowering apparatus in a bore hole drilled into the earth, although it is not limited to such use.

In the exploitation of oil wells, it is frequently necessary to position relatively heavy apparatus in a well by means of a cable which is raised and lowered from the surface of the earth. Much useful information about the behavior of the apparatus during operations of this character may be obtained by observing the tension in the supporting cable. From the tension in the cable, it is possible to determine whether the apparatus is moving properly through the bore hole or whether it has come to rest before the bottom or the desired depth has been reached. Cable tension measurements also enable the operator to determine the location of tight places in the hole or zones in which the bore hole equipment tends to "hang up" or encounter undue friction. In the event that the apparatus sticks in the bore hole, such measurements also enable the operator to put the maximum strain on the cable without breaking it, in an effort to free the apparatus.

Depth correction curves showing the relation between true depth and the tension in the cable are frequently employed in order to increase the accuracy of depth measurements in a drill hole. For any given cable, the tension is not constant, but varies with a number of factors including the depth, the density of any liquid in the bore hole, the diameter and deflection of the hole, and the speed of movement of the cable. Hence, the tension in such a cable at any given depth may vary widely in different bore holes. In order to apply depth correction curves of this type properly, it is essential that accurate measurements of the tension in the cable be available.

Cable tension measurements may also be availed of in making an approximate determination of the instant the apparatus begins to leave the bottom of the bore hole. It is desirable to make this determination whenever the bottom of the hole is taken as a point of reference for depth measurements, so as to minimize errors that may be introduced by elastic elongation of the cable. The determination is generally made by observing the tension in the cable when an increasing force is applied at the surface, and noting the instant when the tension becomes substantially constant. It is assumed that the constant tension indicates that the apparatus has begun to move from its initial position.

It is an object of the invention, accordingly, to provide new and improved apparatus for accurately measuring the tension in a cable.

A further object of the invention is to provide a new and improved cable tension measuring apparatus of the above character which will function accurately whether the cable is moving in either direction of travel or is stationary, and regardless of the angle at which the cable enters or leaves the apparatus.

Another object of the invention is to provide new and improved apparatus of the above character, in which a resilient member is deflected in accordance with the tension in the cable, the deflection of which member serves as a measure of the tension.

A further object of the invention is to provide new and improved tension measuring apparatus of the above character in which an electrical circuit is modified in accordance with the deflection of a resilient member in response to the tension in a cable, whereby an electrical indication of the cable tension may be obtained.

Still another object of the invention is to provide new and improved tension measuring apparatus of the above character which has a substantially linear response.

The objects of the invention are attained by providing tension measuring apparatus comprising a cable deflecting member which is subjected to a force that is a function of the tension in the cable. The force applied to the cable deflecting member is utilized to deflect a resilient member and mechanism is provided for modifying an electrical circuit in accordance with the deflection of the resilient member in order that indications of the tension in the cable may be obtained electrically. The circuit modifying mechanism is preferably so designed that the relation between the tension in the cable and the electrical indications obtained is substantially linear even though the relation between the cable tension and the deflection of the resilient member may not be.

Additional objects and advantages of the invention will become apparent from the following detailed description, taken in conjunction with the accompanying drawings, in which Figure 1 is a view in elevation of apparatus constructed according to the invention for measuring the tension in a cable;

Figure 2 is a plan view of the device shown in Figure 1, partly in section, taken along line 2—2 of Figure 1, looking in the direction of the arrows;

Figure 3:
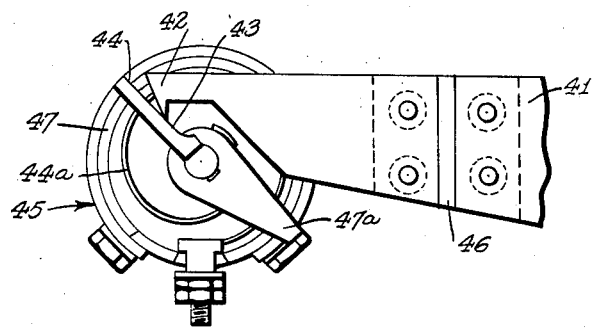
Figure 3 is a view in elevation of part of the apparatus shown in Figure 1.

Referring to Figures 1 and 2, the apparatus comprises a frame including two parallel side members 10 and 11 secured in any suitable manner to conventional channel members 12. At the forward extremities of the side members 10 and 11 are secured a pair of plate members 13 and 14, respectively, which are adapted to co-operate with corresponding hinged plate members 15 and 16 to form parallel coaxial apertures 15a and 16a, whereby the frame may be mounted on the axle 17 of a cable sheave 18. Conventional type latching means 19 are provided for securing the hinged plate members 15 and 16 to the plate members 13 and 14, respectively. The sheave 18 may be supported in any suitable manner, as, for example, by the mounting 18a.

At the rear end of the side member 11 is rotatably mounted a small sheave 20 which is in alignment with the sheave 18. Secured to the side member 11, intermediate the sheaves 18 and 20, is a housing 20a provided with a hub member 21 which extends through an aperture 22 in the side member 11 towards the side member 10. The hub member 21 is provided with a bore 22a within which are fitted conventional type ball bearings 23 in which is journalled a shaft 24. The shaft 24 is provided with a disc-like portion 25 at one end and its other end is reduced in diameter, as shown at 26 in Figure 2. The reduced portion 26 extends through an opening 27 in a plug 28 which serves to retain the ball bearings 23 in proper position in the hub 21.

Secured to the disc-like member 25 is a crank arm 29 on which is mounted the hub 30 of a sheave 31, suitable roller bearings 32 being provided to minimize friction. The sheave 31 is aligned with the sheaves 18 and 20 and it may be held in position on the crank arm 29 in any conventional manner, as, for example, by means of the nut 33. Rigidly secured to the reduced portion 26 of the shaft 24 by key means 26a, for example, is a block 34 to which is secured one end of a leaf spring 35, the other end of which rests upon a roller 36 and is held in position by means of a screw 37.

In operation, the cable 40 of which the tension is to be measured is threaded from the winch (not shown) under the sheave 20 and over the sheaves 31 and 18, as shown in Figure 1. It will be noted that the position of the sheave 31 is such that the cable 40 is deflected from its normal path so that a force is exerted against it which is a function of the tension in the cable 40. This force is transmitted through the crank arm 29, the disc-like member 25, the shaft 24, and the block 34 to the leaf spring 35, producing a deflection thereof which is also a function of the cable tension. The cable tension may be conveniently measured by utilizing the deflection of the leaf spring 35 in any suitable manner to actuate properly calibrated mechanical or electrical indicating means.

In the embodiment illustrated in the drawings, the deflection of the leaf spring 35 is utilized to modify an electrical circuit so that electrical indications may be obtained which are a function of the tension in the cable. This is accomplished, as best shown in Figure 1, by adjusting the rotor of a conventional type potentiometer in accordance with the deflection of the leaf spring 35. To this end, an arm 41 is secured to the block 34 which is provided with a cam portion 42 adapted to ride on a cam surface 43 formed on an arm 44 secured to the rotor of a conventional potentiometer 45. The arm 44 is urged tightly against the cam portion 42 on the arm 41 by a coil spring 44a (Fig. 3) one end of which is secured to the casing of the potentiometer 45 and the other end of which is secured to the rotor thereof as shown.

It may be desirable to provide an insulating joint 46 in the arm 41, as shown in Figures 1 and 3, in order to prevent any possibility of a short circuit.

Experience has shown that the relationship between the deflection of the leaf spring 35 and the force applied thereto from the shaft 24 is not linear. It appears that as the applied force increases, the deflection produced by a given increment of force tends to decrease. In order to provide a substantially linear response in the electrical circuit, the cam surface 43 on the arm 44 on the rotor of the potentiometer 45 should preferably be shaped substantially as shown in Figure 3. It will be noted that this shape provides larger angular increments in the displacement of the rotor arm 44 for large deflections of the arm 41 than for small ones.

Figure 4:
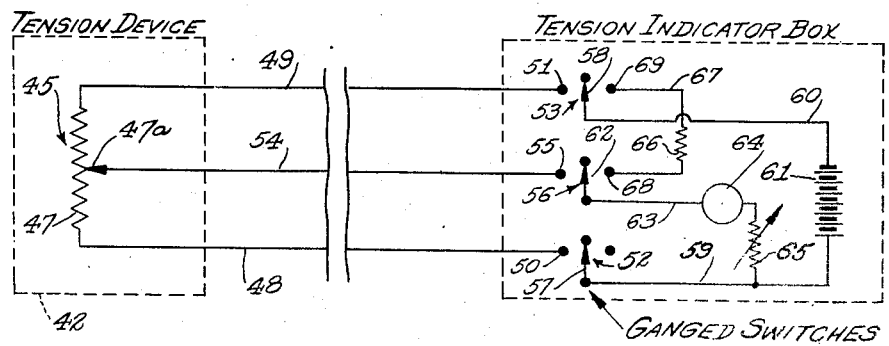
Figure 4 is a schematic diagram of an electrical circuit that may be employed with the apparatus shown in Figure 1 for providing electrical indications of the tension in a cable.

As shown in Figure 4, the potentiometer 45 comprises a resistance 47, the extremities of which are connected by conductors 48 and 49, respectively, to the contacts 50 and 51, respectively, of the switches 52 and 53, respectively. The variable contacts 47a of the potentiometer 45, which is actuated by the rotor arm 44 (Figure 3), is connected by a conductor 54 to the contact 55 of switch 56, which is ganged with the switches 52 and 53.

The movable contacts 57 and 58 of the switches 52 and 53, respectively, are connected by the conductors 59 and 60, respectively, to the terminals of a source of electrical energy 61 which may be a battery, for example. The movable contact 62 of the switch 56 is connected through a conductor 63, a milliammeter or galvanometer 64, and a variable resistance 65 to the conductor 59 and thus to one terminal of the source of electrical energy 61. The milliammeter 64 is preferably calibrated to read tension directly. A fixed resistance 66 is connected by means of the conductor 67 to the contacts 68 and 69, respectively, of the switches 56 and 53, respectively. The resistance 66 forms part of a circuit for compensating for errors that may be caused by variations in the voltage of the battery 61, as described below.

At the time the milliammeter 64 is calibrated, the switches 52, 53 and 56 are moved to the right-hand position (Figure 4) so that the resistance 66 is connected in a circuit including the source of electrical energy 61, the variable resistance 65 and the milliammeter 64. The variable resistance 65 is then adjusted until a predetermined reading of the milliammeter is obtained, after which the calibration is made. Each time the device is used thereafter, the switches 52, 53 and 56 are first moved to the right-hand position and the variable resistance 65 adjusted until the predetermined reference reading of the milliammeter is obtained. This adjustment compensates for any change in the voltage of the source of electrical energy 61 that may occur.

In operation, the resistance 65 is adjusted in the manner described above until the milliammeter 64 reading reaches the predetermined reference value. The switches 52, 56 and 53 are then moved to the left-hand position so that the conductors 48, 54 and 49, respectively, are connected to the conductors 59, 63 and 60, respectively. In this position, voltage from the source of electrical energy 61 is impressed across the fixed resistance 47 and the milliammeter 64 gives a reading which is a function of the potential difference existing between the variable contact 47a of the potentiometer 45 and the conductor 48. Since the position of the contact 47a is a function of the deflection of the leaf spring 35, the milliammeter 64 provides indications directly of the tension in the cable 40.

Obviously, a rheostat might be substituted for the potentiometer 45, in which case it would be connected in series with the millammeter 64 and the source of electrical energy 61. Also, the cam surface 43 on the arm 44 of the potiometer 45 could be eliminated by providing a properly designed non-linear winding for the potentiometer 45. The apparatus may also be modified in other respects, as will be apparent to those skilled in the art.

If desired, a pair of electrically connected Selsyn motors may be employed in the conventional manner to provide indications of tension at a point remote from the apparatus. In such case, the potentiometer arm 44 may be mounted on the shaft of one of the Selsyns, the spring 44a being employed to urge the arm 44 into engagement with the cam portion 42 on the arm 41. The other Selsyn motor may be located at the remote point and it may be used to drive the shaft of a potentiometer like the potentiometer 45 in accordance with the angular rotation of the shaft of the first Selsyn, or it may be connected to any suitable mechanical or electrical indicating device. Two or more sets of indicating equipment might be employed with the potentiometer, rheostat, or Selsyn motor or other electrical equipment for providing indications of tension at a plurality of remote stations.

From the foregoing, it will be apparent that the invention provides a new and improved tension measuring device for giving accurate indications of the tension in a cable whether the cable is stationary or moving in either direction and regardless of the angle at which it enters or leaves the device. It also provides tension measuring apparatus in which a substantially linear tension scale may be obtained on an electrical instrument, even though the relation between the tension and the deflection of a resilient member which actuates the electrical instrument may not be linear.

The embodiment described above is intended merely to be illustrative and not restrictive of the invention. Numerous modifications in form and detail may be made within the scope of the appended claims.

I claim:

1. A device for measuring the tension in a cable comprising a frame mounted in operative relation to the cable, a member on the frame for deflecting the cable to produce a force that is a function of the cable tension, a flat resilient member in the frame, a support for one end of said resilient member, a shaft journaled in the frame and rigidly secured to the other end of said resilient member, means operatively associated with said cable deflecting member for turning said shaft in accordance with the force produced by the cable deflecting member, for deflecting said resilient member in accordance with the tension in the cable, and means for exhibiting a function of the deflection of said resilient member.

2. Apparatus for measuring the tension in a cable, comprising a frame mounted in operative relation to the cable, a flat resilient member in the frame, means for supporting one end of said resilient member, a shaft journalled in the frame and rigidly secured at one end thereof to the other end of said resilient member, a crank arm secured to said shaft, a sheave rotatably mounted on said crank arm, said sheave being adapted to be urged into engagement with the cable so as to apply a force to the crank arm that is a function of the cable tension, and means for exhibiting a function of the deflection of said resilient member.

3. Apparatus for measuring the tension in a cable, comprising a frame mounted in operative relation to the cable, a flat resilient member in the frame, means for supporting one end of said resilient member, a shaft journaled in the frame and rigidly secured at one end thereof to the other end of said resilient member, a crank arm secured to said shaft, a sheave rotatably mounted on said crank arm, said sheave being adapted to be urged into engagement with the cable so as to apply a force to the crank arm that is a function of the cable tension, an electrical indicating circuit, and means for modifying a characteristic of said electrical circuit in accordance with the deflection of said resilient member.

4. Apparatus for measuring the tension in a cable, comprising a frame mounted in operative relation to the cable, a flat resilient member in the frame, means for supporting one end of said resilient member, a shaft journaled in the frame and rigidly secured at one end thereof to the other end of said resilient member, a crank arm secured to said shaft, a sheave rotatably mounted on said crank arm, said sheave being adapted to be urged into engagement with the cable so as to apply a force to the crank arm that is a function of the cable tension, an electrical indicating circuit, means for modifying an electrical characteristic of said indicating circuit, and cam means interposed between said resilient member and said circuit characteristic modifying means, for substantially compensating for any non-linearity in the relation between the tension in the cable and the deflection of said resilient member.

5. Apparatus for measuring the tension in a cable, comprising a frame mounted in operative relation to the cable, a flat resilient member in the frame, means for supporting one end of said resilient member, a shaft journaled in the frame and rigidly secured at one end thereof to the other end of said resilient member, a crank arm secured to said shaft, a sheave rotatably mounted on said crank arm, said sheave being adapted to be urged into engagement with the cable so as to apply a force to the crank arm that is a function of the cable tension, a potentiometer mounted on the frame, having a stator winding and a rotatable contact in engagement therewith, an arm secured to said rotatable contact and rotatable therewith, means mounted on said resilient member for actuating said potentiometer arm in accordance with the deflection of said resilient member, cam means on said potentiometer arm adapted to cooperate with said actuating means to produce a substantially linear relation between the tension in the cable and the rotation of said potentiometer variable contact and to compensate for any non-linearity in the relation between the tension in the cable and the deflection of the resilient member, a source of electrical energy connected to the potentiometer stator winding, and electrical indicating means connected to the potentiometer variable contact and to one end of the potentiometer stator winding.

MAURICE P. LEBOURG.